United States Patent [19]

Krueger

[11] 4,234,615
[45] * Nov. 18, 1980

[54] METHOD FOR MAKING LARGE SIZED BLOCKS OF CHEESE

[75] Inventor: Grant E. Krueger, Green Bay, Wis.

[73] Assignee: Kraft, Inc., Glenview, Ill.

[*] Notice: The portion of the term of this patent subsequent to Jul. 20, 1993, has been disclaimed.

[21] Appl. No.: 930,055

[22] Filed: Aug. 1, 1978

Related U.S. Application Data

[63] Continuation of Ser. No. 705,104, Jul. 14, 1976, abandoned, which is a continuation of Ser. No. 388,101, Aug. 13, 1973, Pat. No. 3,969,952.

[51] Int. Cl.³ .............................................. A23C 19/02
[52] U.S. Cl. .................... 426/478; 100/110; 426/491; 426/582
[58] Field of Search ................ 426/36, 582, 491, 478, 426/495, 518; 100/37, 39, 42, 104, 110, 116, 191, 250, 265, 127; 99/458, 349, 351, 353, 355, 456, 466, 461

[56] References Cited

U.S. PATENT DOCUMENTS

| 706,104 | 8/1902 | Piggott | 100/127 X |
| 1,418,242 | 5/1922 | Fieldman | 100/116 |
| 3,355,805 | 12/1967 | Krueger et al. | 99/458 |
| 3,404,009 | 10/1968 | Lambert et al. | 426/478 |
| 3,523,367 | 8/1970 | Czulak | 426/491 |
| 3,891,783 | 6/1975 | Robertson et al. | 426/491 X |
| 3,969,995 | 7/1976 | Krueger et al. | 99/458 |
| 4,049,838 | 9/1977 | Krueger et al. | 426/491 X |

Primary Examiner—Kenneth M. Schor
Attorney, Agent, or Firm—Fitch, Even, Tabin, Flannery & Welsh

[57] ABSTRACT

Apparatus for and method of pressing, draining and preparing cheese curd for curing is disclosed. The apparatus and method are particularly adapted for forming large sized blocks of cheese. Cheese curd is placed in a form for pressing and draining. At least one blade, in the form of an elongated wedge and having slots in its face, is disposed in the curd to uniformly drain the curd while it is being pressed. The blade is removed and the curd is subjected to further conditioning and is packaged for curing in containers.

9 Claims, 8 Drawing Figures

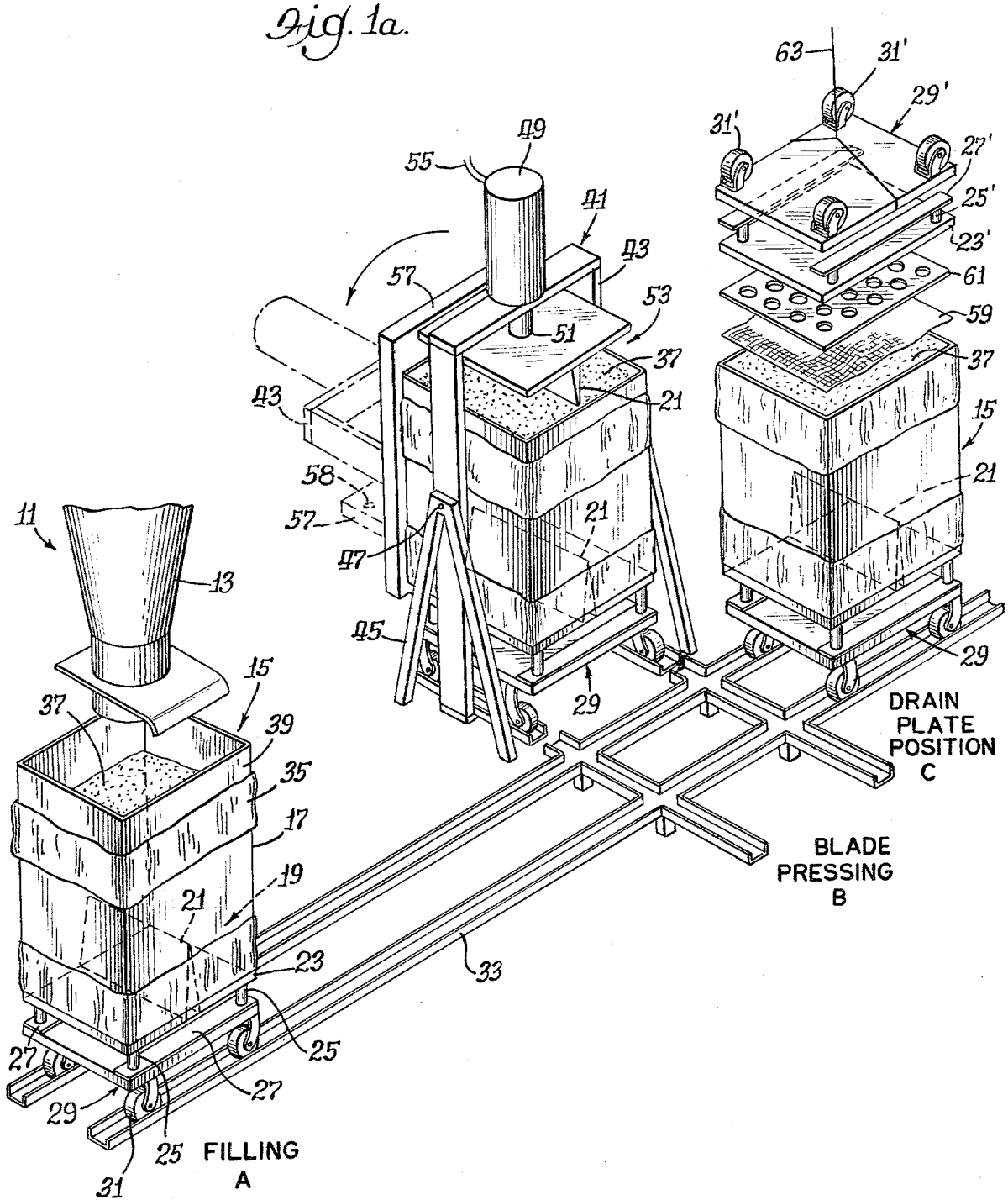

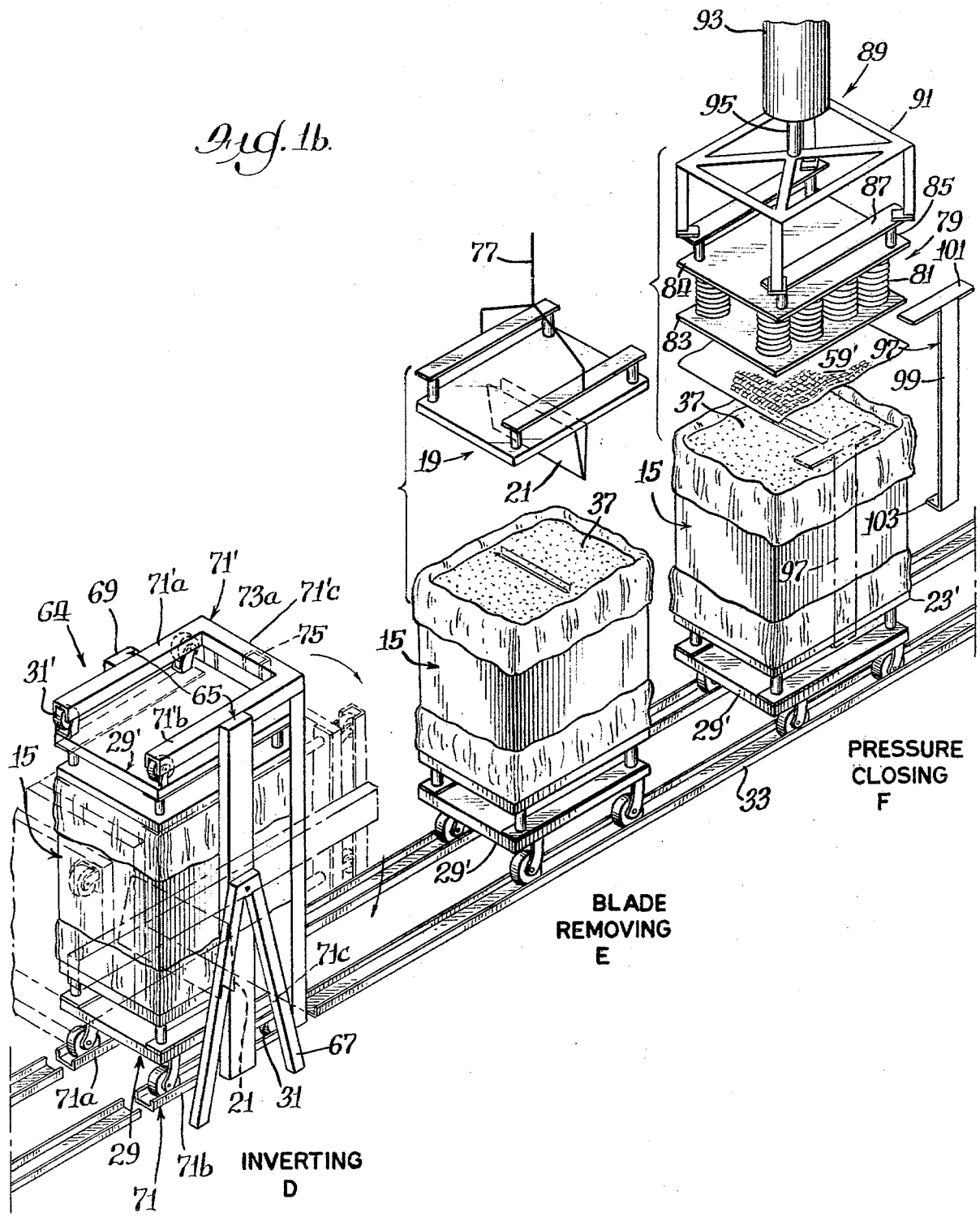

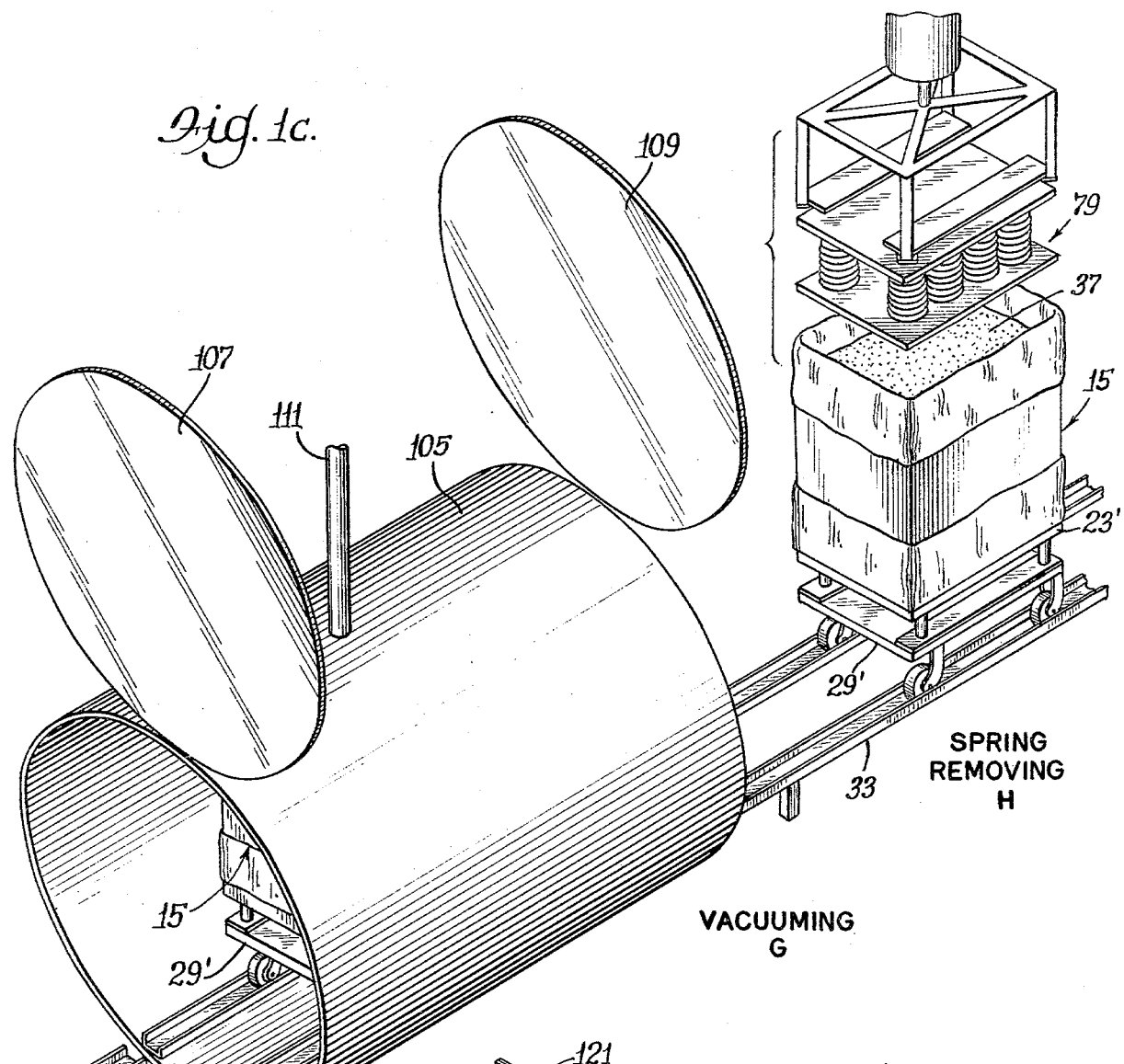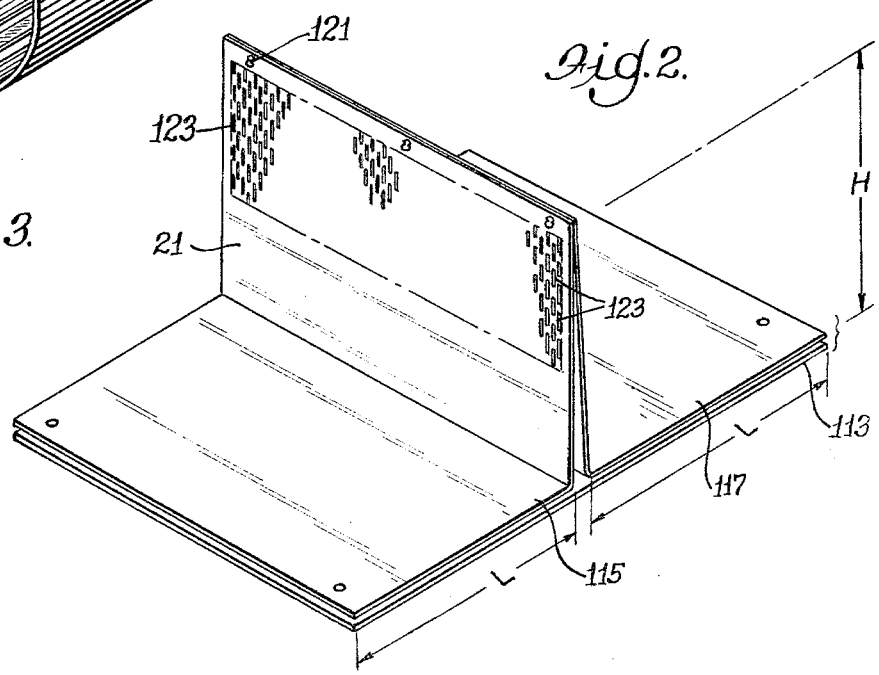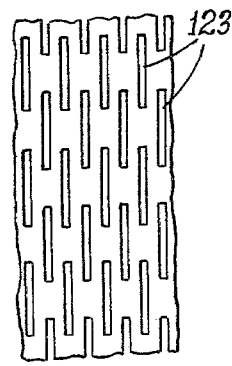

METHOD FOR MAKING LARGE SIZED BLOCKS OF CHEESE

The present application is a continuation of application Ser. No. 705,104, filed July 14, 1976 now abandoned, which in turn is a continuation-in-part of application Ser. No. 388,101, filed Aug. 13, 1973, now U.S. Pat. No. 3,969,952, issued July 20, 1976.

The present invention relates generally to cheese manufacture and more particularly it relates to a method of and apparatus for the production of large sized blocks of American type natural cheese, such as Cheddar or Colby varieties of cheese.

Natural cheese of the American type is manufactured by coagulating ripened milk of proper acidity with rennet, cutting the coagulant and cooking the resulting curd. The whey is drained from the curd, whereupon the curd is pressed and further whey removal is effected. The desired flavor, aroma and texture of the cheese is obtained by curing which involves holding the cheese for a time at desired temperatures.

Natural cheeses have been produced in a variety of unit sizes. In cheese production, however, it has become desirable to produce large rectangular blocks of cheese which, for example, may weigh approximately 700 pounds, as disclosed in U.S. Pat. No. 3,355,805. These large blocks of cheese can readily be divided and packaged. In producing such large blocks of cheese, it has become the practice to drain the free whey from the curd and then to place the drained curd in a rectangular container for pressing, the sides of which container become part of the box in which the blocks of cheese are ultimately formed and cured. The ends of the container are provided with openings through which the whey drains as the curd is pressed. Thus, it has been known to make large blocks of cheese and drain them during manufacture. Subsequently, the containers have been closed and stored for curing.

In the making of large cheese blocks, it is desirable that the moisture content be uniform throughout the block. It is known to accomplish the draining and the pressing of the curd with round probes inserted in the curd to assist in the draining of the whey. However, after the removal of these round probes, soft white spots have been left in the curd mass where the curd did not fuse satisfactorily, and moisture variations from point to point within the block have been greater than desired. Various treatments of the curd blocks after draining, and prior to and during curing have not overcome the problem. It has also been known to use a generally V-shaped perforated pressure plate in connection with the pressing of curd, as shown in U.S. Pat. No. 3,404,009. However, this pressure plate was primarily designed to remove air and is not adapted for the manufacture of large blocks of cheese.

An improved apparatus for draining moisture from large blocks of cheese is disclosed in U.S. Pat. application Ser. No. 388,101 filed Aug. 13, 1973, the disclosure of said patent application being incorporated herein by reference. In accordance with the disclosure of this patent application, a plurality of V-shaped drainer blades are inserted into a large cheese mass during draining so as to facilitate draining and provide uniform moisture distribution. The blades are positioned at the top and bottom of the cheese mass and are spaced at predetermined distances from the walls of the container holding the cheese mass. Such apparatus provides an improvement in whey drainage and moisture distribution but is subject to some disadvantages. The provision of a plurality of drainer blades results in higher capital costs. Also, the separation of the cheese mass at a plurality of points results in undue scarring of the cheese during subsequent curing after removal of the blades.

Accordingly, it is a primary object of the present invention to provide an improved method of and apparatus for manufacture of cheese, particularly in the form of large blocks.

It is a further object of the present invention to provide a method of an apparatus for manufacturing large blocks of cheese with more uniform distribution of moisture and texture throughout the blocks.

These and other objects of the present invention are more particularly set forth in the following detailed description and in the accompanying drawings of which:

FIGS. 1a, 1b and 1c are each parts of a perspective view showing an apparatus and method embodying various features of the present invention;

FIG. 2 is a perspective view of a blade which is part of the apparatus of the present invention and is shown in FIG. 1;

FIG. 3 is a section of the blades shown in FIG. 2; and

Figure 4A:
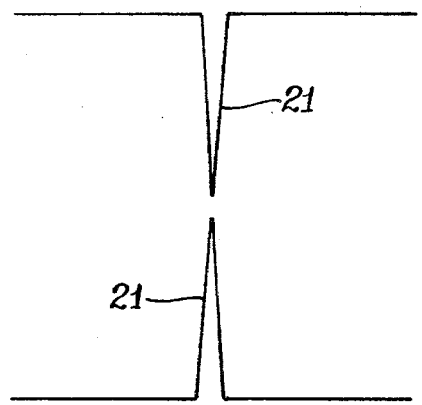
Figure 4B:
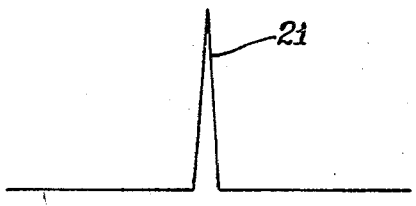
Figure 4C:
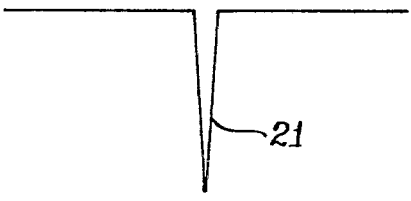

FIG. 4a, 4b, and 4c are schematic end views of blade configurations which may be used in the practice of the invention.

The present invention is applicable to high and low moisture natural cheeses, including, but not limited to, Cheddar, Washed Curd, Stirred Curd, Colby, Brick, Muenster and Mozzarella varieties of cheese. The curd provided during the make of these cheeses may be granular curd or milled curd. In the description of the invention which follows, the curd has been separated from whey and is in particulate form ready for pressing and curing.

INTRODUCTION

The process of the invention involves the curd being passed through a series of stations with the assembly and disassembly of apparatus for effecting the desired conditioning of the curd. FIG. 1 of the drawings, shown on three sheets as FIGS. 1a, 1b, and 1c, discloses the curd passing through the series of stations. Additional features of the invention are described hereinbelow in reference to the embodiment of the invention depicted in FIGS. 1a, 1b, and 1c. Other embodiments are also described hereinbelow. The curd first enters a filling station A and then passes to a blade assembly pressing station B wherein the curd is pressed with drain blades of novel construction which are inserted into the curd in accord with the invention. The curd then passes to a drain plate positioning station C from which it enters an inverting station D. The curd passes into a blade assembly removing station E whereupon it moves to a pressure closing station F. After the curd is under pressure it enters a vacuuming station G and thereafter enters a spring assembly removing station H. The curd may then be further drained, placed under spring pressure and cured in accord with commercial practices which are not detailed herein.

FILLING STATION A

At the filling station A, the curd is shown being discharged from a cyclone separator 11 through its outlet end 13. The curd is filled into an open ended container 15 which is generally rectangular in cross section and includes side walls 17 made of wood or metal materials. The bottom of the container is provided with a first blade assembly 19, which, in the embodiment described in FIG. 1, includes blade 21 which extends into the open ended container 15. The blade assembly 19 is carried upon a tray 23 having legs 25 which connect to feet 27. The tray 23 is carried upon a dolly 29 having casters 31 which travel in a track 33 on the floor. The open ended container 15 is provided with a liner 35, usually of a plastic film material, which extends over the top and under the bottom of the walls 17 of the open ended container 15. For convenience in filling the curd, designated 37 in the drawings, into the open ended container 15, an extension 39 is provided at the top of the container so as to guide the curd from the cyclone separator 11 into the open ended container 15. The extension will be removed after the blade pressing station B.

Thus, at the filling station A, an assembled open ended container 15 is provided which is substantially filled with curd 37 and with the blade assembly 19 provided in the bottom to facilitate uniform draining, as will be hereinafter pointed out.

BLADE PRESSING STATION B

The dolly 29 is moved on the tracks 33 to the blade pressing station B whereat it is moved into a press assembly 41 for applying pressure to the curd in the container 15. The press assembly comprises a frame 43 into which the open ended container 15 on the dolly 29 enters. The frame is pivotally mounted on a support stand 45 upon pivot pins 47. At the top of the frame 43 is mounted a piston 49 which connects by means of a rod 51 to a second blade assembly 53. The second blade assembly 53, in the embodiment shown in FIG. 1, includes a blade like the blade 21 so that they are similarly numbered and differentiated by the symbol prime ('). The blade assembly 53 is forced into the curd 37 by means of the piston 49. The piston connects by means of a pressure line 55 to a source (not shown) of fluid pressure which fluid may be air or liquid.

The frame 43 of the press assembly 41 is provided with a drain pan 57 which is connected to the frame and which is disposed outwardly of the frame a distance sufficient to accommodate the open ended container 15. The drain pan 57 is in a plane generally parallel to the plane of frame 43 and extends above and below the top and bottom, respectively, of the open ended container 15.

The piston 49 is adapted to provide a pressure, by means of the second blade assembly 53, of about four pounds per square inch to the top of the curd 37. Pressures in the range of between about two pounds per square inch and about five pounds per square inch may be utilized with wood containers to achieve desired pressing of the curd. Higher pressure may be employed with metal or specially reinforced containers.

The frame 43, after application of pressure by the piston 49, will be tilted 90° to the position shown by the dotted lines in FIG. 1a, thereby causing the drain pan 57 to underlie the open ended container 15 and collect whey which drains from the blade assemblies 19 and 53 located at each end of the container 15. The rotation is about an axis such that the blades 21 and 21' rotate in their own plane and drainage occurs from throughout the curd through the blades 21 and 21'. The drain pan is provided with a suitable opening 58 through which the whey may drain and be collected in a trough or other collector (not shown). The time of draining will vary with the variety of cheese being made. By way of example, a Cheddar curd will be drained in about 30 minutes while a Colby curd can be drained in 15 minutes. Upon completion of the draining of the whey from the curd, the frame 43 is returned to the upright position and the second blade assembly 53 is withdrawn from the curd. As will be more fully described hereinafter, the blade 21 and 21' are so designed as to minimize disruption of the curd mass upon their removal and are configured so as to permit knitting of the curd to provide a cheese block of uniform texture.

Upon removal of the second blade assembly 53 from the open ended container 15, the dolly 29 is moved out of the press assembly 41 and to the drain plate positioning station C. However, an intermediate pressing of the curd is desirably provided to press any loose curd which may result from removal of the second blade assembly 53. Such intermediate pressing is effected at the pressures provided in the press assembly 41.

DRAIN PLATE POSITIONING STATION C

In the drain plate positioning station C, a press cloth 59 is positioned on top of the curd 37 and a perforated drain plate is placed over the press cloth 59. A second tray assembly 23' like the tray assembly 23 is placed on a perforated plate 61. The second tray assembly 23' has parts corresponding to the tray assembly 23 so corresponding parts are similarly numbered and differentiated therefrom by the symbol prime ('). The tray assembly 23' includes legs 25' and feet 27'. The tray assembly 23' is mounted by a second dolly 29'. These units are mounted on the top of the curd 37 and fit onto the open ended container 15. Suitable carriers 63 may be provided for carrying the dolly 29' and the other units into position for mounting on the open ended container 15.

INVERTING STATION D

The open ended container 15 having the dollies 29 and 29' on the bottom and top, respectively, moves into the inverting station D for rotating the open ended container 15 to turn it upside down. As shown in FIG. 1b, the rotation occurs about an axis in the general plane of the blades 21 thereby causing the separated curd to move together. Such rotation about an axis in the general plane of the blades, however, is not required. An inverter 64 is provided which comprises a frame 65 for receiving the open ended container and its associated dollies 29 and 29'. The inverter frame 65 includes a stand 67 which is pivotally connected to vertically extending sections 69 connecting at each end with generally U-shaped sections 71 and 71' which receive the dollies 29 and 29'. The U-shaped sections 71 and 71' each comprise a pair of spaced track sections 71a and 71b which extend generally parallel and which fit within the track 33. The track sections 71a and 71b connect at one end to a base section 71c. The caster 31 and 31' of the dollies 29 and 29' fit into the track sections 71a and 71b of the U-shaped section 71. The bases 71c and 71c' of the U-shaped sections 71 and 71' connect by means of angle irons 73a and 73b located at the corners of the U-shaped sections and are also connected by means of a channel section 75 which further acts as a stop for the open ended container 15 in the inverter frame 65. The inverter frame is rotated 180°, as indicated, in the inverting station D to turn the open ended container 15 upside down and permit it to roll out to the blade removing station E.

BLADE REMOVING STATION E

In the blade removing station E, the first blade assembly 19 is removed from the open ended container by means of a carrier 77. Thus, at the blade removing station, the curd 37 no longer has either the first blade assembly 19 or the second blade assembly 53 in the curd mass. Care should be taken in removing the blade assembly 19 so that the blades 21 come out without undue disturbance of the curd 37.

PRESSURE CLOSING STATION F

In order to properly prepare the curd for further conditioning in accord with the invention, the open ended container 15, having the perforated plate 61 and press cloth 59 in its bottom, is moved to the pressure closing station F. At the pressure closing station F, a press cloth 59' is placed upon the curd and a spring assembly 79 is mounted on the cloth. The spring assembly 79 comprises a plurality of coil springs 81 which are between two plate sections 83 and 84 which provide substantially uniform pressure upon the curd mass. The bottom plate section 83 presses against the curd 37 through the press cloth 59' and the top plate section 84 is connected to legs 85 which have feet 87.

The spring assembly 79 is forced down onto the curd 37 by means of a pressure unit 89 which comprises a pressure distributing frame 91 for applying pressure to the feet 87 of the spring assembly 79. The pressure distributing frame is connected to a piston 93 by means of a rod 95. The piston 93 through the pressure distributing frame 91 forces the spring assembly 79 down onto the curd 37 and T bar clamps 97 are provided for holding the spring assembly 79 under compression against the curd 37. A T bar clamp 97 is shown in the exploded view at the pressure closing station F and is shown by dotted lines in position on the open ended container 15. The T bar clamps include a bar section 99 which connects at each end to clamping sections 101 and 103 with clamping section 101 engaging the top plate 84 of the spring assembly 79 and the clamping section 103 connecting to the tray assembly 23'.

The spring assembly 79 by means of the coil springs 81 applies a pressure of about one-half pound per square inch to the curd 37. This pressure should be between about one-quarter pound per square inch and one pound per square inch.

The pressure of the spring assembly 79 may be effected by other pressure means such as piston arrangements and rub bars.

VACUUMING STATION G

The curd 37 under pressure of the spring assembly 79 enters the vacuuming station G as shown in FIG. 1c. At the vacuuming station, a partial vacuum is established to provide improved knitting of the curd during the curing of the cheese. The extent of the vacuum and the time of the vacuuming step is varied depending upon the particular variety of cheese and the extent to which it is desired for the cheese to close up during curing. Since Cheddar cheese is desired to have close body characteristics and Colby cheese will have somewhat more open body characteristics, the Cheddar cheese will be subjected to higher vacuum for longer time than the Colby cheese would be subjected. In this connection, good Cheddar cheese body is obtained at a vacuum of about two inches of mercury absolute in about one hour whereas the desired Colby cheese body is obtained at about 15 inches of mercury absolute in about 15 minutes.

The vacuuming apparatus is shown generally schematically in FIG. 1c as comprising a cylindrical chamber 105 which has closures 107 and 109 at each end. The chamber 105 communicates with a source of vacuum (not shown) through a line 111. The closures 107 and 109, of course, close over the tracks 33 to provide a seal. The chamber is of sufficient size to accommodate the open ended container 15 and can be of such size as to hold more than one open ended container 15. After the vacuum conditioning of the curd, the open ended container is removed from vacuuming station G on the tracks 33.

The vacuuming of the curd is correlated to the pressing and handling steps preceding the vacuuming station G. The combination of the pressing and handling steps with the vacuum step provides the knit and texture desired for the variety of cheese being manufactured.

SPRING REMOVING STATION H

At the spring removing station H, the spring assembly 79 is removed from the open ended container 15 so that it is then ready for closing and storing for the curing period desired for the particular variety of cheese. However, before final closure, the dolly 29' and tray assembly 23' are removed from the container 15 and in effecting such removal and closing, the curd is subjected to a pressure of about one-half pound per square inch and is then permitted to drain for an additional 30 to 45 minutes. During final closing of the open ended container 15, rotation is again provided about an axis generally in the plane of the openings in the curd made by the blades 21 and 21', and intermediate pressing is provided to maintain the curd 37 in compacted condition. Upon final closing of the container 15 a spring assembly is provided in the container to maintain the curd during curing under a pressure of between about one-quarter pound per square inch and about one pound per square inch with a pressure of about one-half pound per square inch being preferred for achieving suitable knitting of the curd during curing.

PRINCIPLES OF OPERATION

It is an important feature of the present invention to provide whey drainage capacity at or near an axis of the cheese block. By the term "axis" is meant any imaginary line which can be extended through the cheese block and which also passes through the center of gravity of the cheese block. It has been discovered that the advantages of the invention in respect to uniform whey drainage can be attained by use of at least one V-shaped, perforated, planar, drainage blade, provided that the blade is positioned in the cheese block in a manner so that the leading edge of the "V" is substantially aligned with an axis of the cheese block. When such positioning of the V-shaped drainage blade is effected, a single drainage blade can be used to provide uniform whey drainage so long as the whey drainage capacity of the blade is at least 5 square inches of uniformly distributed perforated openings at whey drainage area per linear inch of blade length. Preferably blades are used which have from about 5 to about 20 square inches of whey drainage area per linear inch of blade length. Higher whey drainage capacities by use of multiple blades or denser perforations can be provided without any detriment. However, no substantial benefit in respect to whey drainage rate or volume is achieved through the use of higher capacities. As shown in FIG. 2, it is preferred to provide a peripheral edge around the blade which is devoid of perforations so as to reduce the tendency of the blade to flex. The peripheral edge can be from about ½ to 1½ inches in width.

As indicated, such whey drainage capacity can be provided by a single blade so long as the blade is properly oriented with respect to an axis. As shown in FIGS. 4b and 4c, single blades located at either the top center or bottom center of the cheese block can provide adequate whey drainage capacity. Also, single blades positioned diagonally (not shown) at either the top or bottom of the cheese block can provide adequate drainage. Diagonally positioned blades are sometimes preferred since they can be made longer and can be oriented near a longer axis than transversely positioned blades.

The reasons for the ability of a single blade to provide adequate whey drainage are not fully understood. However, while not wishing to be bound by any theory, it is believed that during the pressing operation, whey is caused to migrate internally of the cheese block toward the center of mass while it is, at the same time, being expressed from the exterior surface. The location of a whey drainage site near an axis by proper positioning of a single blade provides a path for removal of the centrally migrating whey. In this connection, it has been determined that whey drainage perforations over the entire surface of the blade are not required. It is the openings nearest the axis which are most important to effect drainage. In this connection, the whey drainage area for a single blade can be reduced to 3 square inches per linear inch of blade length if the whey drainage area is concentrated near the leading edge of the blade "V" as shown in FIG. 2. For this embodiment, it is preferred to use drainer blades having from about 3 to about 10 square inches of whey drainage area per linear inch distributed uniformly in the half of the blade closest to the leading edge. This is considered an important feature to reduce and limit any passage of the curd particles through the blades.

BLADE ASSEMBLY

Now to consider the blade assemblies 19 and 53 of FIGS. 1a, 1b, and 1c in greater detail, reference is particularly made to FIGS. 2 and 3 of the drawings. The blade assemblies 19 and 53 are generally similar although one provides the bottom of the container 15 during filling and the other is associated with the press assembly 41. Each blade assembly is made out of perforated metal sections, preferably of stainless steel so as to avoid any problems of corrosion. The blade assemblies include a generally rectangular frame 113 to which are attached the blades 21. The frame 113 may be attached to the press assembly 41 or may be placed in the tray 23. The blades 21 are generally V-shaped and are shown in the drawings as build up from generally L-shaped sections 115 and 117. The upstanding ends of the L-shaped sections 115 and 117 are bolted to the frame 113 by bolts or rivets 121.

The base of the L-shaped sections 115 and 117 are spaced apart a maximum distance of about four inches so that the open end of the V-shaped blades is only spread apart about four inches. It is most preferable to have the spacing two inches or less. It is important that the blade 21 not spread the curd any more than a total of about four inches considering the total number of blades used on a given side, and preferably not more than two inches if desired knitting and curing of the curd is to be achieved. In this connection, wider spacings can be used than are disclosed in U.S. Pat. application Ser. No. 388,101, since only one blade is located on a side.

In the illustrated embodiment of FIGS. 1a, 1b and 1c, to produce a 640 pound block of cheese, the upstanding portions of the L-shaped sections 115 and 117 are about 14 inches. This is shown at dimension H in FIG. 2. The base portions of the L-shaped sections 115 and 117 are about 14 inches in width and this distance is denoted by the letter L in FIG. 2. The total width of the base portion is about 28 inches. Of course, other dimensions can be used to produce different sized blocks of cheese. It is important that the dimension H and the dimension L each be about ½ of the height and length, respectively, of the cheese block so that the leading edge of the "V" of the drainer blade is positioned to be substantially in alignment with an axis of the cheese block. Of course, for diagonally oriented drainer blades, the distance L will vary from 0 to ½ of a diagonal to obtain the proper orientation.

In order to achieve the best results and curd which will knit together for satisfactory curing, the L-shaped sections 115 and 117 are fabricated to provide perforations of particular conformation and a section is shown in detail in FIG. 3. The blade perforations comprise a plurality of elongated openings 123 which are disposed in staggered relation in the blades 21. These elongated openings should extend in the direction of insertion and removal of the blade assemblies 19 and 53. It is important that the width of the openings 123 be of such dimension as to limit any passage of curd particles through the blades. The openings should also be sufficiently narrow as not to lock curd particles into the openings 123. It is desirable that the openings be elongated so that upon removal of the blades any curd particles can be substantially wiped from the openings 123 due to the action resulting from removal of the blade assemblies 19 and 53. It will be understood that there can be some variation in the size of the openings 123 to accommodate particular curd varieties and depending upon whether a milled curd or granular curd is being treated. It has been found, however, that satisfactory results can be achieved with both milled curd and granular curd with the openings 123 having a width of from about 1/32 to about 1/16 inch and a length of from about ⅜ to about ⅝ inch. It has also been determined that round perforations having a diameter of from about 3/64 inch to about 5/16 inch are suitable.

This configuration of the perforations in the blades 21 permits the draining of the curd 37 with subsequent withdrawal without undue disturbance of the curd thereby permitting uniformity of moisture throughout the curd and knitting of the curd without voids or marks appearing in the curd. This is important since the large sized blocks are cut into relatively small pieces in the ultimate packaging of the resulting cheese so that if the knitting and curing are not uniform, there can be wasteage of cheese. The use of single blade conformations also obviates knitting problems.

The variations of blade arrangement set forth in FIGS. 4a, 4b and 4c were used to prepare several 640 pound blocks of cheese. Several other 640 pound blocks of cheese were prepared using the four blade arrangement described in U.S. patent application Ser. No. 388,101. The blades were used in the apparatus described hereinabove. Each of the blades contained 3/16 inch by ½ inch perforations distributed uniformly over both planar surfaces of the blade to provide 137 square inches of whey drainage area per blade. For some runs, half of the perforations of both planar surfaces of each blade closest to the surface of the cheese block were blocked off to prevent whey drainage therefrom.

For each run the whey which drained from the cheese block at the blade pressing station B was collected and weighed and the results are reported below in Table I. After weeks of curing the moisture at various positions in the cheese block was determined and is reported below in Table I. As set forth in Table I the blade distribtuion numbers refer to the blade arrangements described in FIG. 4. For those runs where the blade was partially blocked, the blade number is followed by the letter "B". Those blocks of cheese made with the four blade arrangement of U.S. Pat. application Ser. No. 388,101 are designated "C" for unblocked runs and "CB" for blocked runs.

The various features of the invention which are believed to be new are set forth in the following claims.

What is claimed is:

1. In a method for manufacturing a block of cheese of uniform texture and moisture distribution from curd in particulate form comprising the steps of filling the curd into a container, locating a perforated, V-shaped blade wholly in the curd, said V-shaped blade having two side walls diverging from the apex of the blade, opening the curd by means of the two diverging side walls of the blade, applying pressure to the curd while the blade is in the curd, draining the curd through the blade, and removing the blade to permit knitting of the curd to provide a cheese block of uniform texture and moisture, the improvement comprising: locating the apex of a V-shaped blade substantially along an axis of said container; providing at least 3 square inches of perforated area per linear inch of blade length; locating all of the

TABLE I

| MONTH | VAT | BOX NO. | TIME IN PRESS | LBS. PRESSURE | BLADE DISTRIBUTION | # DRAINAGE | CURD TEMP. | TOP MOIS. 3" | TOP MOIS. 6" | CENTER MOIS. | BOTTOM MOIS. 6" | BOTTOM MOIS. 3" |
|---|---|---|---|---|---|---|---|---|---|---|---|---|
| March 24 1976 | 11 | 46 | 16 min. | 75 lbs. | CB | 37 lbs. | 92° | 37.9 | 37.4 | 37.4 | 38.3 | 37.5 |
| | 11 | 47 | 16 | 75 | 4a | 35 | 92 | 37.5 | 37.5 | 37.1 | 37.6 | 37.6 |
| | 11 | 48 | 17 | 75 | C | 38 | 92 | 37.1 | 36.3 | 36.8 | 37.0 | 36.5 |
| | 12 | 50 | 15 | 75 | CB | 40 | 89 | 36.8 | 36.8 | 36.7 | 36.0 | 37.3 |
| | 12 | 51 | 15 | 75 | 4a | 35 | 89 | 37.2 | 37.0 | 36.5 | 36.7 | 37.0 |
| | 12 | 51 | 15 | 75 | C | 38 | 89 | 37.2 | 36.7 | 36.8 | 37.3 | 37.1 |
| | 13 | 54 | 15 | 75 | CB | 42 | 89 | 37.6 | 37.3 | 37.3 | 37.4 | 37.0 |
| | 13 | 55 | 16 | 75 | C | 44 | 89 | 37.7 | 37.0 | 36.6 | 36.3 | 37.2 |
| | 13 | 56 | 16 | 75 | 4a | 33 | 89 | 37.3 | 37.5 | 36.9 | 37.7 | 38.0 |
| | 14 | 59 | 17 | 75 | 4a | 33 | 89 | 37.0 | 36.7 | 36.8 | 36.6 | 37.2 |
| | 14 | 60 | 16 | 75 | CB | 37 | 89 | 37.2 | 36.9 | 36.7 | 36.9 | 36.8 |
| | 14 | 61 | 16 | 75 | C | 35 | 89 | 37.2 | 37.0 | 36.9 | 37.0 | 37.3 |
| | 15 | 63 | 17 | 75 | 4a | 36 | 92 | 37.5 | 36.9 | 37.2 | 36.7 | 38.0 |
| | 15 | 64 | 16 | 75 | CB | 38 | 92 | 37.5 | 37.1 | 36.1 | 37.4 | 37.4 |
| | 15 | 65 | 16 | 75 | C | 37 | 92 | 37.5 | 37.4 | 37.3 | 37.5 | 37.8 |
| | 10 | 41 | 145 | 75 | C | 31½ | 94 | 37.4 | | 37.1 | | 37.6 |
| | 10 | 42 | 15 | 75 | 4a | 26½ | 94 | 37.8 | | 37.5 | | 37.1 |
| | 11 | 45 | 15 | 75 | C | 39 | 92 | 37.9 | | 37.9 | | 47.2 |
| | 11 | 46 | 15 | 75 | 4c | 34 | 92 | 37.8 | | 38.6 | | 38.5 |
| | 11 | 47 | 15 | 75 | 4b | 27 | 91 | 37.7 | | 36.9 | | 37.4 |
| | 12 | 50 | 15 | 75 | 44a | 32 | 93 | 37.1 | | 36.7 | | 36.6 |
| | 12 | 51 | 15 | 75 | CB | 33 | 94 | 37.1 | | 37.9 | | 38.1 |
| | 12 | 52 | 15 | 75 | C | 31 | 94 | 37.2 | | 37.1 | | 37.2 |
| | 13 | 54 | 15 | 75 | CB | 42 | 92 | 37.1 | | 37.4 | | 38.3 |
| | 13 | 55 | 15 | 75 | C | 42 | 92 | 37.0 | | 36.8 | | 37.1 |
| | 13 | 56 | 15 | 75 | 4a | 34 | 92 | 38.8 | | 37.9 | | 38.0 |
| | 14 | 58 | 15 | 75 | 4c | 25 | 94 | 37.5 | | 37.9 | | 37.5 |
| | 14 | 59 | 15 | 75 | 4b | 21 | 94 | 37.4 | | 37.1 | | 36.1 |
| | 14 | 60 | 15 | 75 | C | 32 | 93 | 37.5 | | 37.6 | | 37.2 |
| | 14 | 61 | 18 | 75 | C | 27½ | 94 | 36.7 | | 37.0 | | 38.0 |
| | 15 | 63 | 15 | 75 | C | 40 | 92 | 37.2 | | 37.2 | | 37.5 |
| | 15 | 64 | 15 | 75 | 4b | 26½ | | 37.4 | | 37.2 | | 36.9 |
| | 15 | 65 | 15 | 75 | 4c | 26½ | 92 | 37.6 | | 37.3 | | 37.1 |

Above samples taken with No. 30 butter trier, the outside 2½" were removed from the plug and the remaining plug ground and mixed for analysis.

It is believed that the foregoing explanation of the method and apparatus of the invention is adequate for its practice by one skilled in the art. Many variations will be apparent to one skilled in the art for accomplishing desired manufacture of differing varieties of cheese. The best method for practicing the invention with Colby or Cheddar cheese curd is described hereinbefore.

The method and apparatus, hereinbefore described, provides procedures for the handling of curd through the formation of cheese utilizing large block formation with uniformity of knitting and curing. It provides a marked advance in the cheese making art which is provided by the unique apparatus and method.

perforated area of said V-shaped blade in the half of said blade closest to the apex thereof for whey drainage; and opening the curd by means of the two side walls of the blade by a maximum distance of 4 inches and not less than a distance sufficient to accommodate the diverging side walls such that said walls are separated by a space only adequate to allow whey flow between said walls.

2. A method in accordance with claim 1 wherein the perforated area of said V-shaped blade is at least about five square inches per linear inch.

3. A method in accordance with claim 1 wherein the perforated area of said V-shaped blade is from about three to about ten square inches per linear inch.

4. A method in accordance with claim 1 comprising the additional steps of pressing the curd after removal of the blade under a pressure of at least about one-quarter pound per square inch and vacuuming the curd while it is under a pressure of at least one-quarter pound per square inch.

5. A method in accordance with claim 1 wherein a second perforated, V-shaped blade is located in said curd, said second blade also being located so that its apex is located adjacent and substantially along an axis of said container and also having the perforated, whey drainage area in the half of said blade closest to the apex thereof.

6. A method in accordance with claim 5 wherein the perforated area of said second V-shaped blade is at least about five square inches per linear inch.

7. A method in accordance with claim 5 wherein the perforated area of said second V-shaped blade is from about three to about ten square inches per linear inch.

8. A method in accordance with claim 5 wherein the apex of the first V-shaped blade and the apex of said second V-shaped blade are along the same axis.

9. A method in accordance with claim 5 wherein the apex of the first V-shaped blade and the apex of said second V-shaped blade are along different axes.

* * * * *

UNITED STATES PATENT AND TRADEMARK OFFICE
CERTIFICATE OF CORRECTION

PATENT NO. : 4,234,615
DATED : November 18, 1980
INVENTOR(S) : Grant E. Krueger

It is certified that error appears in the above-identified patent and that said Letters Patent are hereby corrected as shown below:

Column 9, line 12, "distribtuion" should be --distribution--.

In TABLE I, column designated as BOX NO., line 6, "51" should be --52--.

In TABLE I, column designated as TIME IN PRESS, line 16, "145" should be --15--.

In TABLE I, column designated as BLADE DISTRIBUTION, line 21, "44a" should be --4a--.

In TABLE I, column designated as BOTTOM MOIS. 3", line 18, "47.2" should be --37.2--.

Signed and Sealed this

Fourteenth Day of April 1981

[SEAL]

Attest:

RENE D. TEGTMEYER

Attesting Officer  Acting Commissioner of Patents and Trademarks